United States Patent [19]

Short et al.

[11] 4,297,445

[45] Oct. 27, 1981

[54] CONTINUOUS PRODUCTION OF OLEFIN BLOCK COPOLYMERS

[75] Inventors: James N. Short; Donald D. Norwood, both of Bartlesville, Okla.

[73] Assignee: Phillips Petroleum Co., Bartlesville, Okla.

[21] Appl. No.: 79,745

[22] Filed: Sep. 28, 1979

[51] Int. Cl.$^3$ .................... C08F 255/02; C08F 255/04
[52] U.S. Cl. ....................................... 525/52; 525/53; 525/268; 525/323
[58] Field of Search .................... 525/323, 52, 53, 268

[56] References Cited

U.S. PATENT DOCUMENTS 3,702,352 11/1972 Leibson ............................... 525/323
3,732,335 5/1973 Hermans et al. .................... 525/323

FOREIGN PATENT DOCUMENTS 601560 2/1960 Italy ..................................... 525/323
889230 2/1962 United Kingdom ................. 525/323

Primary Examiner—William F. Hamrock

[57] ABSTRACT

A method for continuous production of block copolymers having a block of propylene homopolymer and blocks of polymer of ethylene. The block copolymers produced thereby. In a first stage a first reaction mixture containing a polymer of ethylene is produced with continuous transfer of a portion of this reaction mixture along with propylene monomer and a catalyst modifier into a second stage in which a block copolymer having a block of propylene homopolymer and blocks of polymer of ethylene is produced. In preferred embodiments the polymer of ethylene is ethylene homopolymer and/or ethylene-propylene random copolymer.

6 Claims, No Drawings

CONTINUOUS PRODUCTION OF OLEFIN BLOCK COPOLYMERS

BACKGROUND OF THE INVENTION

This invention relates to olefin polymerization. In one of its aspects this invention relates to the production of block copolymers of olefins. In another of its aspects this invention relates to a continuous process for producing block copolymers of olefins. In a preferred aspect the invention relates to producing impact-resistant block copolymers having a block of propylene homopolymer and blocks of a polymer of ethylene.

Batch polymerization processes employing a catalyst system which exhibits a relatively high productivity by employing two components with a first component prepared from materials such as titanium tetrachloride, ethyl benzoate, and magnesium chloride and a second component prepared from materials such as triethylaluminum and ethyl anisate are well known in the art. Such a catalyst system produces large quantities of solid polymer per unit of catalyst. Ser. No. 703,473, filed July 8, 1976, now U.S. Pat. No. 4,234,710 provides an improved catalyst and a process for its use by incorporating into the first component a solid organic material such as durene which is inert to the catalyst component. The incorporation of a material such as durene improves the batch polymerization process by improving the stereospecific nature of the catalyst to provide an even higher yield of usable polymer per unit of catalyst.

A continuous process for producing block copolymers having blocks of propylene homopolymer and blocks of polymers of other olefins, particularly polymers of ethylene, has now been discovered using the catalyst formerly known to be useful in batch processes in which several additional advantages accrue. Due to the reactivity of the catalyst system used, all or substantially all of the residual ethylene passing into the second reaction stage is consumed in the second reaction stage. It is not necessary, therefore, to separate ethylene from propylene in a monomer recovery zone as it would be in current processes where ethylene is polymerized in a second reactor in the presence of liquid propylene. It can be seen that such advantages can be of great importance economically. Since ethylene is polymerized rapidly with the catalyst system employed, the reactor used in the first stage of a two-stage polymerization process can be much smaller, i.e., about 10 percent of the size of the reactor of the second stage rather than approximately the same size when propylene is polymerized first. The ethylene polymer is polymerized first because the ethylene polymer segment of desirable impact-resistant block copolymers containing propylene homopolymers generally amounts to less than about 20 weight percent of the total polymer.

It is, therefore, an object of this invention to provide a continuous process for the production of polymerized products of 1-olefins in which at least two reactors are employed in a series. It is another object of the invention to provide a continuous process for the production of block copolymers in which the blocks are made up of propylene homopolymer blocks and blocks of polymers of ethylene. It is another object of this invention to provide polymers made by the process of this invention.

Other objects, aspects, and the various advantages of this invention will become apparent upon reading this specification and the appended claims.

STATEMENT OF THE INVENTION

A method is provided for the continuous production of block copolymers in which there are a block of propylene homopolymer and blocks of polymer of ethylene in which a first reaction mixture containing a polymer of ethylene is produced in a first stage with continuous transfer of a portion of this first reaction mixture along with a propylene monomer feed and a catalyst modifier into a second stage in which there is produced a block copolymer in which there are blocks of propylene homopolymer and blocks of polymer of ethylene. In preferred embodiments of the invention the polymer of ethylene is, at least, an ethylene-propylene random copolymer and can be, in addition, an ethylene homopolymer.

Stated in other words it can be said that in the process of the invention, a homopolymer of ethylene or a copolymer of ethylene and another 1-olefin, preferably propylene, is produced in zone 1. After a suitable residence time, a portion of the reaction mixture is continuously transferred to zone 2 along with propylene and a catalyst modifier to produce a polymeric product comprising a block of crystalline polypropylene, a block of the polymer produced in zone 1 and a block of a random polymer of the monomer(s) from zone 1 and propylene.

The catalyst employed in the process is one that is especially active for the polymerization of ethylene and propylene. The catalyst can consist of a titanium compound, i.e., titanium tetrachloride, supported on magnesium chloride, optionally containing a Lewis base, i.e., ethyl benzoate and a solid or liquid aromatic hydrocarbon, i.e., durene, xylenes and 1-hexene. The catalyst composite is intensively mixed as with a rotary ball mill, vibratory mill, etc. for a time sufficient to activate the catalyst for polymerization.

An organometal compound such as triethylaluminum, diethylaluminum chloride, and the like, is used as a cocatalyst. An adjuvant can be added to the second stage reactor to improve the formation of stereospecific polymer in that stage. The adjuvant, if used, can be a Lewis base either identical to or different from the adjuvant used in the first stage of the reaction. Detailed information for a durene-containing catalyst is given in the application cited above. Related catalyst systems are described in Ser. No. 744,896, filed Nov. 24, 1976, now U.S. Pat. No. 4,107,412 and Ser. No. 860,263, filed Dec. 13, 1977, now U.S. Pat. No. 4,242,480.

The propylene homopolymer produced in the second stage is about 70 to about 90 weight percent of the total polymer made in the process. The polymer produced in the first zone which preferably is ethylene homopolymer and/or a random ethylene-propylene copolymer containing from about 1 to about 80 mole percent propylene, therefore, constitutes only from about 10 to about 30 weight percent, more preferably from about 12 to about 25 weight percent, of the total polymer made in the process. Note that there will always be a random copolymer block formed and that ethylene homopolymer is formed only when ethylene monomer along is the olefin feed to the first reaction zone. The normally solid final products are well suited for conversion by conventional means, e.g., injection molding, extrusion, blow molding, compression molding, thermoforming, and the like, into tough, impact resistant articles.

Impact-resistant polymers made by this process that are of the most interest have the following general properties: melt flow (ASTM D 1238, Condition L), g/10 minutes ranging from about 0.1 to about 20, flexural modulus (ASTM D 790) ranging from about 80,000 to about 200,000 psi (550 to 1380 MPa), brittleness temperature (ASTM D 746) ranging from about −55° F. (−48° C.) to about 30° F. (−1° C.) and densities ranging from about 0.88 to about 0.91 cc/g. Polymers with properties outside of these ranges can be made by manipulating residence times in each reactor, polymerization temperature, hydrogen concentration and the like as is well known in the art.

The reactors used in each stage are of conventional design. A convenient type is a closed circuit loop reactor such as is disclosed in U.S. Pat. No. 3,437,646 and U.S. Pat. No. 3,732,335. In the present invention, reactor one is smaller than reactor two, i.e., its volume ranges from 10% to about 50% of that of reactor two. It is within the scope of the invention to use two reactors in stage 1 in series with each of the stage 1 reactors contributing a portion of the total residence time required in the first stage.

In the process of this invention, a residence time ranging from about 5 minutes to about 20 minutes is utilized in zone 1. Polymerization is continued in stage 2 where a residence time ranging from about 30 minutes to about 110 minutes is employed. The residence times are determined by the reaction temperature, reactor volume, reactor throughput and quantity of catalyst which are needed to produce the desired impact-resistant copolymers.

In general the catalyst systems and other conditions used in the individual reaction stages of this invention are well known in the art. The advantages obtained from this invention are generally derived from the provision for producing the propylene homopolymer block in the second zone so that other olefin monomers used in the first zone reaction can be used up while the propylene homopolymer block is being made. This removes the necessity for separation of propylene and other monomers which would prevent carrying out a continuous reaction process.

Although the reaction conditions are well known and do not in themselves form part of the invention, for the sake of clarity the general ranges for the reaction conditions are recited below:

First stage reaction conditions:
  temperature—about 90° to 200° F. (32°–93° C.)
  pressure—about 500 to 750 psig or higher (3.4 to 5.2 MPa)
  Note: Need sufficient pressure to maintain nonboiling liquid conditions in reactor.
Second Stage reaction conditions:
  temperature—about 100° to 180° F. (38°–82° C.)
  pressure—see above
  Note: Generally, the first stage reaction is conducted at a slightly lower temperature than the second stage reaction.
Whole Ratios, etc.:
  Cocatalyst:$TiCl_4$, about 100:1 to 5000:1 in stage 1, combined for both stages is about 20:1 to 1000:1.
  Lewis base:$TiCl_4$, about 0.25:1 to 2:1
  Lewis base:$H_2$, about 0.05 to 5 mole percent based on reactor contents.
Aromatic hydrocarbon in catalyst ranges from about 1 to 50 weight percent of the catalyst, e.g., $TiCl_4$, $MgCl_2$, aromatic hydrocarbon, and Lewis base (if used; for solid (durene) hydrocarbons, 1 to 50 weight percent is suitable, for liquid hydrocarbons, 1 to 20 weight percent is suitable.

EXAMPLE 1

The synthesis of an impact resistant, normally solid polymeric product from ethylene and propylene in a continuous process employing two closed-loop, liquid-full reactors in series is set forth in the following calculated example. The diluent used in stage 1 is isobutane (142.5 pounds [64.6 kg] per hour). The diluent in stage 2 comprises 94.2 weight percent isobutane and 5.8 weight percent propylene supplied from carryover diluent from the first stage and propylene feed charged in the second stage. Stage 1 reactor has a 10 gallon (0.038 m$^3$) capacity and the stage 2 reactor has a 50 gallon (0.19 m$^3$) capacity. The components are charged and circulated and effluents withdrawn in the manner familiar to those skilled in the art. A catalyst consisting of a milled composite of 12.08 weight percent $TiCl_4$, (3.05 weight percent Ti), 39.10 weight percent $MgCl_2$, 39.26 weight percent durene and 9.56 weight percent ethyl benzoate (EB) is charged to each reactor in pulses of about 60 pulses/minute with about 0.0095 grams of catalyst/pulse. A triethylaluminum (TEA) cocatalyst [0.26 pounds (118 g) per hour] is charged to reactor 1 along with a catalyst (0.00126 pounds [0.57 g] per hour), isobutane (142.5 pounds [64.6 kg] per hour), ethylene (22.7 pounds [10.3 kg] per hour), and hydrogen (0.0124 pounds [5.6 g] per hour). In reactor 2 liquid propylene (87.0 pounds [39.5 kg] per hour), catalyst (0.0143 pounds [6.49 g] per hour) and ethyl benzoate (0.049 pounds [22.2 g] per hour) as an adjuvant to improve stereospecificity of the polymer produced therein are charged. A reactor temperature of 125° F. (52° C.), a pressure of 600 psig (4.1 MPa gage), and a residence time of 17.5 minutes is used in reactor 1 to produce polyethylene at a solids level of 9.15 weight percent A reactor temperature of 140° F. (60° C.), reactor pressure of 600 psig and residence time of 60 minutes is used in reactor 2 to produce polymer at a solids level of 40 weight percent. Recovered polymer from stage 2 is 101 pounds (45.8 kg) per hour. A calculated molar ratio of TEA:$TiCl_4$ of 2840:1 is used in stage 1 to polymerize ethylene. The calculated combined TEA:$TiCl_4$ molar ratio (both stages) is 230:1. A calculated molar ratio of EB:$TiCl_4$ of 42:1 is used in stage 2. A calculated molar ratio of TEA:ethyl benzoate of 7:1 is employed in stage 2. Calculated catalyst productivity is 6490 pounds polymer per pound total catalyst charged per hour.

The effluent from reactor 2 is treated to remove catalyst residues and the polymer recovered in the manner known in the art. For example a mixture of propylene oxide and acetylacetone can be used as disclosed in U.S. Pat. No. 3,281,399. The recovered polymer is contacted with an antioxidant system consisting of 0.15 parts by weight dilauryldithiopropionate and 0.1 parts by weight octadecyl[3-(3,5-di-t-butyl-4-hydroxyphenyl)]propionate, per 100 parts by weight polymer and milled in a Banbury mixer at 400° F. (204° C.) for about 5 minutes to homogenize the product and disperse the stabilizers. The final product sought in this process should have melt flow of about 2, ASTM D 1238-65T, condition L, a flexural modulus of about 160,000 psi (1100 MPa), ASTM D 790-66, a brittleness temperature of about 0° F. (−18° C.), ASTM D 746-64T, an Izod impact strength at 70° F. (21° C.) of about 3 feet/pounds/inch notch (162 J/m), ASTM D 256-56, and a density of about 0.90 g/cc.

The composition of the polymeric product is considered to consist of a crystalline polypropylene block weighing about 70 weight percent of the polymer, a polyethylene block weighing about 15 weight percent of the polymer and an ethylene/propylene random copolymer block (50/50 weight percent ethylene/propylene) weighing about 15 weight percent of the polymer.

EXAMPLE 2

The synthesis of a polymer composition from ethylene and propylene in a continuous process employing again two closed loop, liquid full reactors in series similar in nature to that produced in Example 1 can be calculated. The capacity of reactor 1 is 1.84 gallons (0.0070 m$^3$) and the capacity of reactor 2 is 50 gallons (0.19 m$^3$). The components are charged and circulated and effluents withdrawn as in Example 1. Isobutane is used as a diluent in reactor 1. In reactor 2, the diluent comprises 30.8 weight percent isobutane and 69.2 weight percent propylene. The components specified in Example 1 are charged, circulated and products withdrawn as described before. A triethylaluminum (TEA) cocatalyst (0.35 pounds [159 g] per hour) is charged to reactor 1 along with catalyst (0.00118 pounds [0.54 g] per hour), isobutane (42.3 pounds [19.2 kg] per hour), ethylene (16.4 [7.44 kg] per hour), and hydrogen (0.00573 pounds [2.60 g] per hour). In reactor 2, liquid propylene (171.6 pounds [77.8 kg] per hour), catalyst (0.015 pounds [6.80 g] per hour), ethyl benzoate (0.093 pounds [42.2 g] per hour) as an adjuvant are charged. A reactor temperature of 125° F. (52° C.), a pressure of 600 psig (4.1 MPa gage), and a residence time of 10 minutes is used in reactor 1 to produce polyethylene at a solids level of 30 weight percent. A reactor temperature of 140° F. (60° C.), reactor pressure 600 psig and a residence time of 60 minutes is used in reactor 2 to produce polymer at a solids level of 40 weight percent. Recovered polymer from stage 2 is 94 pounds (42.6 kg) per hour. A calculated molar ratio of TEA:TiCl$_4$ of 4080:1 is used in stage 1 to polymerize ethylene. The calculated combined TEA:TiCl$_4$ molar ratio (both stages) is 298:1. A calculated molar ratio of TEA:EB of 4.95 is employed in stage 2 and a calculated molar ratio EB:TiCl$_4$ of 65:1 is also employed in stage 2. Calculated catalyst productivity is 5810 pounds polymer per pound total catalyst charged per hour.

The effluent from reactor 2 is treated to remove catalyst residues and the polymer is recovered, stabilized and milled in the manner described before. It is sought to prepare a polymeric product in this example that has physical properties that correspond with the product of Example 1.

The examples show that a normally solid impact-resistant block polymeric product comprising about 70 weight percent polypropylene, about 15 weight percent polyethylene and about 15 weight percent ethylene/propylene random copolymer (50/50 weight percent ethylene/propylene) can be produced in a continuous process employing at least two reactors in series. The random, rubbery ethylene/propylene copolymer which is produced in situ is dispersed throughout the other polymer blocks produced during the process. Thus, an impact-resistant, block, polymeric product is obtained without the necessity of separately obtaining the rubbery copolymer and milling it into a polypropylene homopolymer or block copolymer of propylene and ethylene.

Since all the ethylene from reactor 1 is consumed in reactor 2, the separation of diluents from polymer product and recovery and purification of propylene for recycling to reactor 2 is simplified. Separation and purification of propylene and isobutane from other components is accomplished as is known in the art by employing fractional distillation and the like.

We claim:
1. A method for the continuous production of block copolymer comprising:
 (a) producing in a first zone a first reaction mixture comprising an ethylene homopolymer by reacting ethylene monomer in the presence of a catalyst system comprising TiCl$_4$, MgCl$_2$, and an organo metallic compound at a temperature in the range of about 90° to about 200° F. and a pressure above about 500 psig sufficient to maintain non-boiling liquid conditions in said first zone for a time in the range of about 5 to about 20 minutes;
 (b) continuously introducing a portion of said first reaction mixture, propylene monomer, and a catalyst modifier to a second zone; and
 (c) producing in said second zone block copolymer comprising blocks of propylene homopolymer and random ethylene-propylene copolymer by reaction in the presence of a catalyst system comprising TiCl$_4$, MgCl$_2$, and an organo metallic compound at a temperature in the range of about 100° to about 180° F. and a pressure above about 500 psig sufficient to maintain non-boiling liquid conditions in said second zone for a time in the range of about 30 to about 110 minutes to provide a total copolymer composition of about 10 to about 30 percent by weight of polymers of ethylene and about 70 to about 90 percent by weight of propylene homopolymer.

2. A method for the continuous production of block copolymer comprising:
 (a) producing in a first zone a first reaction mixture comprising ethylene-propylene copolymer by reacting ethylene propylene monomer in the presence of a catalyst system comprising TiCl$_4$, MgCl$_2$, and an organo metallic compound at a temperature in the range of about 90° to about 200° F. and a pressure above about 500 psig sufficient to maintain non-boiling liquid conditions in said first zone for a time in the range of about 5 to about 20 minutes;
 (b) continuously introducing a portion of said first reaction mixture, propylene monomer, and a catalyst modifier to a second zone; and
 (c) producing in said second zone a block copolymer comprising blocks of propylene homopolymer and ethylene-propylene copolymer by reaction in the presence of a catalyst system comprising TiCl$_4$, MgCl$_2$, and an organo metallic compound at a temperature in the range of about 100° to about 180° F. and a pressure above about 500 psig sufficient to maintain non-boiling liquid conditions in said second zone for a time in the range of about 30 to about 110 minutes to provide a total copolymer composition of about 10 to about 30 percent by weight polymers of ethylene and about 70 to about 90 percent by weight of propylene homopolymer.

3. A method of claim 1 or 2 wherein said catalyst system in the first zone comprises at least one of the compounds chosen from a Lewis base, durene and aromatic hydrocarbon.

4. A method of claim 1 or 2 wherein said catalyst system in the second zone comprises at least one of the compounds chosen from Lewis base, durene, and an aromatic hydrocarbon.

5. A method of claim 1 or 2 wherein said catalyst system is intensively mixed for a time sufficient to provide polymerization activation.

6. A method of claim 1 or 2 wherein said first zone and said second zone each comprise a liquid full loop reactor.

* * * * *